United States Patent Office 3,718,157
Patented Feb. 27, 1973

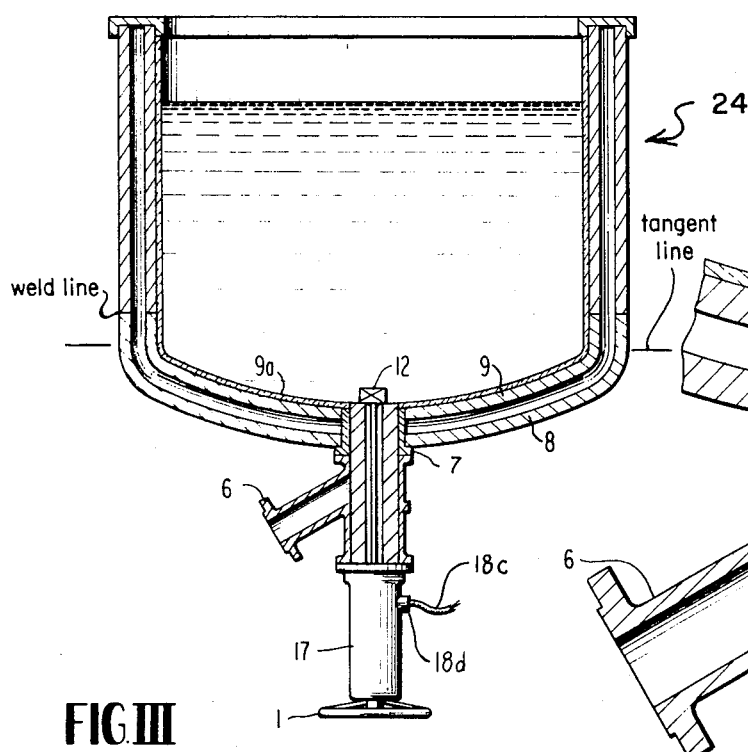
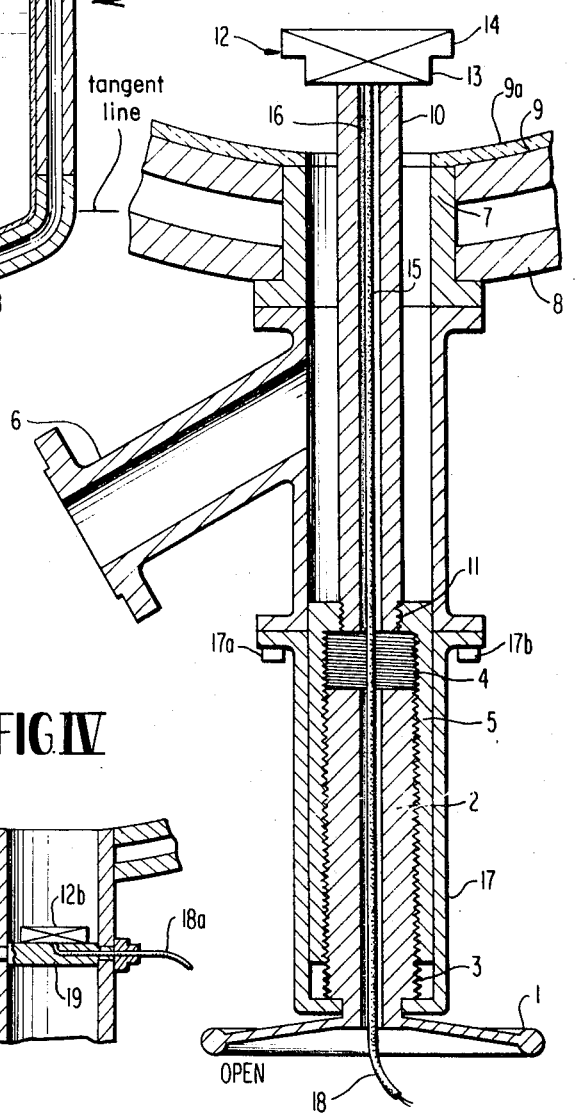
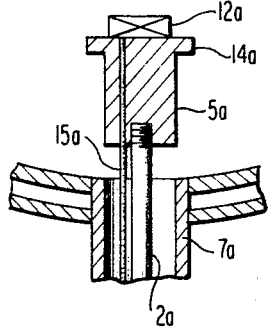
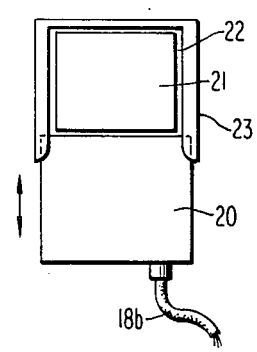
INVENTORS
FRANK H. SIEBENTRITT
ESTEBAN SILVERA
BY William T. Hough
ATTORNEY

3,718,157
RAM-VALVE LEVEL INDICATOR
Frank H. Siebentritt, Lebanon, N.J., and Esteban Silvera, Bronx, N.Y., assignors to North Branch Industries, Inc., North Branch, and William T. Hough, Basking Ridge, N.J., fractional part interest to each
Filed June 1, 1971, Ser. No. 148,338
Int. Cl. F16k 37/00
U.S. Cl. 137—551
18 Claims

ABSTRACT OF THE DISCLOSURE

In a preferred embodiment, a ram-valve having a conduit extending about centrally along its longitudinal axis, with a liquid level indicator for measuring the vessel contents, with the level indicator mounted on top of the distal end of the ram-valve, making possible the measurement of the contents at levels well below the weld and tangent lines of the vessel above which most prior art level indicators are located, thereby avoiding prior art vessel weak points coincident with insertion of an indicator through the glass-lined double-walled vessel.

SPECIFICATION

This invention relates to an improved level indicator and/or other measuring device in combination with an outlet valve, such that novel results are obtained and prior art problems are avoided, in the vessels requiring instrumentation for measurement of level, pH, temperature, and/or the like.

BACKGROUND

Prior to this invention, typically level-measuring devices were inserted through apertures in the vessel double walls, the aperture drilled in the outer jacket-wall being aligned with the aperture drilled in the shell-wall, these apertures normally being cut in the side of the vessel above both the weld line and the tangent line. In such vessels, there exists a substantial quantity of contents or at least space for contents below the weld and tangent lines for which there is no completely adequate provision for the accurate measuring thereof. In some such vessels, the level measurement apertures for insertion of the level measuring device have been placed through the walls of the vessel bottom, i.e. below the tangent line, but are still subject to the resulting weak point in the glass-lined structure as well as the task of piercing the glass lining with the associated risks thereof. In any glass-lined vessel in which the side or bottom wall(s) has(have) been pierced for the insertion of such an instrument, there has been thereby produced a weak-point (a stress-point) in the wall(s) which has proven to be a source of problems from the standpoint of leakage and/or rupture of the vessel lining, or the like, resulting in hazards and therefore safety problems, particularly since often the vessel contents are inflammable.

A typical alternative measuring device which at least avoided puncture of the vessel wall(s) of the side or bottom, is a gas-bubbling tube-level indicator which typically bubbles air or nitrogen gas or the like from the end of a tube extending downwardly into the liquid contents of the vessel, the pressure required to force-out the bubbles being proportionate to the pressure of the liquids above the tube bubble-exit and accordingly proportionate to the level of the liquid contents within the vessel. In this type of measuring instrument, there are vessel tube-support problems and the flow of the nitrogen or other gas bubbles is at a relatively low rate and accordingly a notorious problem is the clogging of the gas exit (outlet(s)) because of the back-up liquid plugging-up the tubes which characteristically are about ½ inch in diameter, as well as such bubbler-tube instruments being extremely expensive (costly). Thus, although the liquid below the tangent and weld lines may be measured by such an instrument, and although there is avoided the problems associated with the producing of stress-point(s), the use of this type instrument has proven to be impractical for reason of the plugging problem noted above. Continual maintenance of such a gas-flow tube also is a problem because the tube is subjected to both the forces of agitation and corrosion. Accordingly, although the problem of weak (stress) point(s) is recognized in the prior art, conventional vessels have continued to use the side wall-piercing measuring instruments, for example, for reason of the absence of a suitable substitute alternative.

For such vessels, particularly in continuous processes in which the vessel contents are fed from the vessel outlet, other measured information is often necessary, such as temperature and/or pH, or the like. The same or similar problems are encountered with such measuring devices, as to where to insert the measuring instrument into the contents, relative to the vessel and the problems discussed above. Additionally, when temperature and/or pH is measured at a point removed from the outlet, the measurement is not altogether a representative measurement of the property(ies) of the contents at the outlet.

SUMMARY OF THE INVENTION

Objects of this invention include the overcoming of the above-discussed and other problems, together with the obtaining of advantages heretofore unobtainable by the heretofore use of available and/or conventional instruments and measuring devices. Other objects become apparent from the preceding and following disclosure.

The objects of the invention are obtained by one or more of embodiments which include the combination of measuring instrument with the outlet valve of any desired or conventional type, in a structural combination such that the measuring instrument is in contact with the vessel contents when the valve is opened or closed, a preferred embodiment being a ram-valve having a conduit (bore) extending along the ram-valve's longitudinal axis normally (but not necessarily) centrally of the ram-valve for the insertion therethrough of a hydraulic liquid-carrying tube and/or of an electrical connector such as a strain-cell connector for a preferred strain cell mounted at about the distal end of the ram-valve, or above or supported from the end of the ram-valve. Accordingly the strain cell, or other measuring instrument, is held within the vessel contents adjacent the vessel outlet at a point well below the weld and tangent lines, without imparting a needless stress-point in the wall(s) of the bottom or side of the vessel. Additional advantages are obtained by other embodiments described hereafter, such as, for example, the measuring instrument mounting means (for mounting in connection with the ram-valve) including an elongated shaft of lesser diameter (or cross-section) than the ram-valve supporting the measuring instrument but also the measuring instrument mounting means being of a shape such that the portion at the top (distal end) serves as an alternative plug when it becomes desirable to completely withdraw the ram-valve for repair or replacement, or for work within the conduit(s) below the outlet valve while there is still a substantial quantity of vessel contents within the vessel. The above and other embodiments are described more fully hereafter.

THE FIGURES

FIG. I is an in-part sectional side view of a typical double-walled vessel to which the invention principally is directed, disclosing in section the vessel, the outlet (vessel drain) and outlet conduit, and the inventive ram-valve (preferred embodiment) and strain cell (a preferred embodiment) mounted thereon, the lever and lever casing not being shown in section.

FIG. II is a sectional side view of the base-portion of a double-walled tank, illustrating a preferred embodiment of the type described above, in which the measuring instrument is a strain cell having support structure in the form of a plug supported on a slender hollow shaft extending upwardly from the distal end of the ram-valve.

FIG. III is a sectional side view of the base-portion of a double-walled tank, illustrating an embodiment in which the ram-valve is inserted downwardly to close the outlet, having the measuring instrument such as a strain cell mounted on top thereof.

FIG. IV is a sectional side view of the base-portion of a double-walled vessel (tank), illustrating an embodiment in which the valve is a butterfly (wafer) valve, having the measuring instrument, such as a strain cell, mounted on the face of the wafer normally facing upwardly when the valve is closed, with the electrical connector extending into, axially along, the longitudinal axis of the lever, and out of the lever on the outside of the vessel outlet conduit.

FIG. V is a top plan view of a typical slide-valve embodiment of the invention, with the strain-cell slide disc being slideable from the open position—as shown—to a closed position closing the aperture-opening to the outlet conduit, and in the closed position the strain cell registering the weight of the contents in typically a hopper containing stone, gravel, or the like.

DETAILED DESCRIPTION OF THE INVENTION

There are many possible variations on the invention as disclosed herein, and it is not practical to describe and/or illustrate each and every possible variation thereof. The above illustrated embodiments and embodiments described hereafter are intended to disclose some preferred embodiments as well as to illustrate the invention broadly for better understanding thereof.

For ease of identification, the FIG. I is labeled with the identifying names of some of various parts. It should be noted that although particular types of ram-valves and of their levers (and mechanisms) are illustrated, any conventional (preferably ram-type) valve, lever, and mechanism may be adapted to the invention, the invention not being in the particular mechanism by which the lever is actuated to open and/or to close, but representative mechanisms nevertheless being illustrated to improve understanding of workable embodiments. Although manually actuated ram-valves are illustrated, hydraulic, pneumatic, or electrical actuation piston or screw or other actuation mechanism(s) may be employed. In the FIG. I embodiment, the measuring instrument is mounted on the upwardly-extending distal end of the ram-valve and is in effect an extension of the ram-valve. It might be noted that ram-valves sometimes stop flush with the bottom of the vessel, but more recently conventionally have been designed to project into the vessel above the bottom in order to clear-out the outlet (drain) and/or to prevent sediment and/or sludge from settling into or above the outlet. It is equally advantageous for the instrument to be mounted on a ram which in the closed position holds the measuring instrument at least slightly above the bottom to avoid the interference from sediment and/or sludge, but it is also desirable that the measuring instrument be reasonably close to the bottom in order to measure the full depth of contents and/or to be closer to the outlet to more accurately measure the contents first to exit upon the opening of the valve.

In an embodiment such as that illustrated in FIG. I, in the open position the movement of the flowing liquid contents would impart false readings and/or readings varying over a wide range and thereby interfering with an easy and/or reliable following of actually existing level, for example; to overcome such a problem, either as a part of the instrumentation and/or as a part of the fluid-conduit system there must (or should be) a conventional (or desirable) dampener, such as a fluid dampening device or an electrical dampening device, for example.

FIG. II illustrates a ram valve in the open position. The handle 1 has been twisted (turned) typically clockwise (or if so designed, counter-clockwise) such that the lever shaft 2 having threads 3 acts against the threads 4 of the non-revolvable ram-valve 5 which has moved downwardly sufficiently to completely open the outlet conduit 6 extending from the outlet (drain) 7 of the double-walled vessel having the jacket 8 and the shell 9, together with the glass lining 9a. The hollow shaft 10 has a threaded base 11 screwed into a threaded aperture in the upper distal end of the ram-valve 5. At the upper distal end of the shaft, the instrument support structure is shape as a plug 12, and an illustrated embodiment of the plug 12 includes a base section 13 of a diameter normally about the same as that of the outer-diameter of ram-valve 5, while the optional upper lip portion 14 is of greater diameter than the outer-diameter of the ram valve 5. The ram-conduit strain-cell connector 15 extends through the bore (conduit) 16 of the shaft 10. Casing 17 supports the revolvable lever shaft 2. The connector-lead 18 is continuous with the ram-conduit strain-cell connector 15. Further withdrawing of the ram-valve below the normal "open" position serves to draw-down the plug 12 into the outlet to plug the outlet. The outlet for the illustrated embodiment includes stops (not shown) which prevent rotation of the plug and shaft after they reach the plugging position; further turning of the handle to further withdraw the ram-valve 5 is normally not possible until the flange bolts 17a and 17b are removed whereby thereafter the entire ram-valve 5 and casing 17 turns with the handle to unscrew the threads 11 of shaft 10 from the ram-valve 5. For detection of empty or about empty vessel, the embodiments of FIGS. I and II are more suitable than embodiments in which the measuring-instrument support shaft slideably extends through the ram valve and remains stationary as the ram-valve moves between closed and open positions, for example.

FIG. III discloses the two-way movement upwardly or downwardly of the ram-valve 5a, the support lever shaft 2a, the strain-cell connector 15a, an optional plug-lip 14a, the annular measuring instrument 12a, and the outlet (drain) 7a.

FIG. IV discloses the butterfly (wafer) valve 19 in the closed position, the connector-lead 18a and the mounted measuring instrument 12b.

FIG. V illustrates a typical hopper slide valve 20 including therein typically a strain cell such that when the valve is slid over the aperture (outlet conduit mouth) 21 along the track 22 of the frame 23, the weight of the dry contents still within the hopper will be registered by the upwardly facing strain cell embodied in the slide valve 20, and the signal relayed by way of the electrical connector-lead 18b.

In the embodiments of FIGS. I and II, the pen-recorder removed-from (i.e., at a distance from) the tank normally would register a sudden increase in tank level or gallons (as the case may be) concurrent with the opening of the valve—i.e. as the level or quantity measuring instrument is lowered in the tank by the lowering of the ram-valve; immediately upon completion of the valve opening operation, there would be indicated (by the recorder pen) a gradual lowering of tank level or of remaining gallons, as the liquid drained from or was withdrawn from the tank. Thus, by interpolation relative to the length of the "valve opening" upright pen mark, the exact level may be determined by adding that length of mark to the decreasing gradual mark at any point during the withdrawal; for an automatic controlled set to withdraw a predetermined amount, the control may be modified to deduct that amount of level or gallons (as the case may be) equal to the length of the "valve opening" upright pen mark. An alternative possibility would be to have the pen and recording chart set to indicate correct reading during a withdrawal, and the negative reading when the ram valve is closed.

In another typical embodiment, not illustrated, the ram-valve may (as in the illustrated embodiments of FIGS. I and II) have a bore (channel) and the measuring instrument mounted on an upper distal end of a shaft extending through the bore, with the shaft maintaining normally a fixed position while the ram-valve is slideably movable upwardly and downwardly around the shaft, this embodiment giving greater accuracy of measurement; also, the supporting structure at the top end of the shaft may be shaped as a plug (or second ram-valve) and, when the ram-valve is lowered into the open position to open the vessel outlet, the plug may be separately lowered into a plugging position, locked by virtue of an overlapping lip and/or by a cross-locking pin at a point above the withdrawn ram-valve such that the ram-valve may be withdrawn, repaired, replaced, and/or the conduit(s) (below the locked plug) removed, repaired, replaced, cleaned, or the like.

Although a strain cell has been referred to repeatedly for the illustrated embodiments, a hydraulic diaphragm instrument, and/or pneumatic instrument, and/or any other desirable, suitable, and/or conventional instrument may be substituted for an/or used in conjunction with the strain cell.

The vessel typically to which this invention is most advantageously applicable are the glass-lined or plastic lined vessels which are most susceptible to the problems of stress points introduced when instrumentation is inserted through the side and/or bottom of the vessel(s).

In addition to the plug(s), ram(s) (ram-valve(s)), and the like, as illustrated, there may be additionally where advantageous, desirable, or necessary, a seal ring and/or the like employed.

The meter(s) and/or indicating means connected to and/or constituting a part of the measuring device(s) of this invention may be any one or more of conventional, desired, or developed instruments as are adaptable and/or appropriate, as adapted to vessel(s) containing liquid(s), liquid-solid(s), solid(s), slurry(ies), or other such combination(s).

The strain cell referred to in this disclosure is of any conventional or desired design adaptable to the use disclosed herein, typically of the Wheatstone bridge type, connected to an indicator and to a power source.

In addition to advantages already set forth above, the employment of the inventive valve combination of this disclosure makes possible substantial cost reduction by avoiding the necessity of heretofore separate costly incorporation of instruments through the vessel wall or bottom wall and/or as a part of additional superstructure associated with the tank (vessel).

Although the tank illustrated in FIG. I appears to be a non-pressurized vessel, the invention is equally suitable to pressurized vessels and/or to vacuumed or low-pressure vessels.

The illustrations and examples set forth in this disclosure are intended to serve only to illustrate the invention to improve the clarity of undertsanding, but are not intended to be construed to unduly limit the invention scope, this invention including those modification(s) and equivalent structure(s) as would be obvious to a person of ordinary skill in this art.

We claim:

1. A device comprising, in combination, a vessel having an outlet means, movable valve means operative to open and to close said outlet means, and a measuring means for measuring at least one property of said vessel's predetermined contents with which said valve means is employable, said measuring means being mounted above and connected with said valve means and being adapted to measure said property when in contact with said vessel's contents, said valve means being a ram-valve having a conduit extending about centrally along the longitudinal axis thereof, and in which said measuring means is mounted at a distal end of said ram-valve with a connector of said measuring means within said conduit.

2. A device according to claim 1, in which said measuring means includes (a) a shaft extending from said distal end of said ram-valve's longitudinal axis, and (b) a sensing means mounted on a distal end of said shaft, said shaft being of a cross-section less than said ram-valve's cross-section.

3. A device according to claim 2, in which said sensing means is a plug of a plug diameter at least as large as said ram-valve's diameter, and in which said plug is separately lockable into a plugging position, and in which said ram-valve is detachable from said plug when said plug is locked into said plugging position.

4. A device according to claim 3, in which said plug includes a lip of greater diameter than said ram-valve's diameter.

5. A device according to claim 1, in which said sensing means is measurable of at least quantity of contents of a vessel with which said valve means is employable.

6. A device according to claim 5, in which said sensing means is a diaphragm hydraulic instrument.

7. A device according to claim 5, in which said sensing means is a strain cell.

8. A device according to claim 5, including a double-walled vessel which comprises a glass-lined shell and a jacket and which is shaped to include a tangent line and weld line, said vessel including said outlet means below said tangent line and said weld line, and said ram-valve being mounted within said outlet means.

9. A device comprising, in combination, a vessel having an outlet means, movable valve means operative to open and to close said outlet means, and a measuring means for measuring at least one property of said vessel's predetermined contents with which said valve means is employable, said measuring means being mounted above and connected with said valve means and being adapted to measure said property when in contact with said vessel's contents, said vessel being a double-walled vessel which comprises a shell and a jacket, said vessel being structured to include a tangent line, said vessel including said outlet means below said tangent line, said valve means being mounted within said outlet means, said valve means being a ram-valve having a conduit extending about centrally along the longitudinal axis thereof, in which said measuring means is mounted at a distal end of said ram-valve with a connector of said measuring means within said conduit, in which said measuring means includes (a) a shaft extending from said distal end and about axial with said ram-valve's longitudinal axis, and (b) a sensing means mounted on the distal end of said shaft, said shaft being of a cross-section less than said ram-valve's cross-section, in which said plug is separately lockable into a plugging position, and in which said ram-valve is detachable from said plug when said plug is locked into said plugging position.

10. A device according to claim 9, in which said sensing means is measurable of quantity of contents within said vessel.

11. A device according to claim 9, in which said sensing means is measurable of pH of contents within said vessel.

12. A device according to claim 9, in which said sensing means is measurable of temperature of contents within said vessel.

13. A device comprising, in combination, a vessel having an outlet means, movable valve means operative to open and to close said outlet means, and a measuring means for measuring at least one property of said vessel's predetermined contents with which said valve means is employable, said measuring means being mounted above and connected with said valve means and being adapted to measure said property when in contact with said vessel's contents, said measuring means including a vessel-contents quantity measuring means, said vessel being a double-walled vessel which comprises a glass-lined shell and a jacket, said vessel being structured to include a tangent line and a weld line, said vessel including said outlet means below said tangent line and said weld line, and said valve being mounted within said outlet means.

14. A device according to claim 13, in which said measuring means is a diaphragm hydraulic instrument.

15. A device according to claim 14, in which said valve means is a butterfly valve.

16. A device according to claim 14, in which said valve means is a hopper slide-valve.

17. A device of claim 13, in which said vessel outlet-valve means is a ram-valve.

18. A ram-valve quantity-sensing vessel-outlet device comprising, in combination: outlet structure (a) defining a first conduit and mountable as a vessel outlet in a base of a tangent line and weld line-containing vessel at a site below the vessel's tangent line and weld line, the conduit being of sufficient cross-section to receive a ram-valve therein, (b) defining a sideward port second conduit communicating with the first conduit, and (c) defining a ram-valve enclosure located below said port second conduit and axially aligned with and communicating with said first conduit; a ram-valve means operative to open and to close the first conduit; and a vessel's-contents quantity-measuring means mounted movably with and at about a distal upper end of said ram-valve means, such that vessel-contents quantity is measurable at the base of the vessel by contents in contact with said quantity-measuring means; said ram-valve having a conduit extending about centrally along the longitudinal axis thereof, and said measuring means having a signal-transmitting connector within said conduit.

References Cited
UNITED STATES PATENTS 3,178,150   4/1965   Johnson _____ 251—144 X HENRY T. KLINKSIEK, Primary Examiner U.S. Cl. X.R.

251—144